Figure 1:
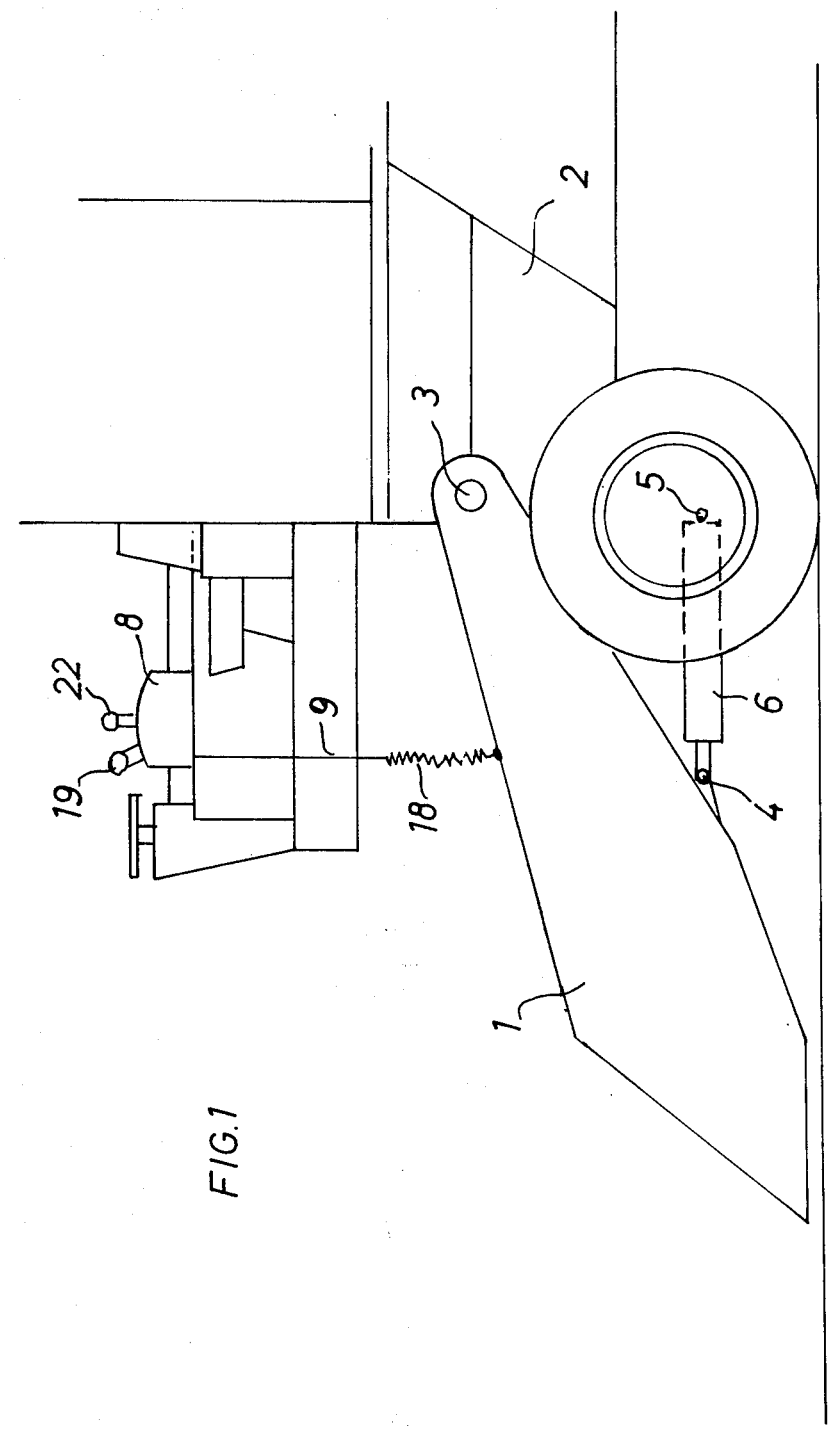

United States Patent [19]

Schumacher, II et al.

[11] 4,130,981

[45] Dec. 26, 1978

[54] CONTROL SYSTEM AND METHOD FOR COMBINE HARVESTERS

[76] Inventors: Gustav Schumacher, II; Günter Schumacher, both of 5231 Eichelhardt, Westerwald, Fed. Rep. of Germany

[21] Appl. No.: 698,762

[22] Filed: Jun. 22, 1976

[30] Foreign Application Priority Data

Jun. 30, 1975 [DE] Fed. Rep. of Germany ....... 2529160

[51] Int. Cl.² .......................................... A01D 67/00
[52] U.S. Cl. .................................................... 56/208
[58] Field of Search ..................... 56/208, 10.4, 14.5, 56/14.6

[56] References Cited

U.S. PATENT DOCUMENTS

| | | | |
|---|---|---|---|
| 3,509,701 | 5/1970 | Clarke | 56/208 |
| 3,568,420 | 3/1971 | Hofer et al. | 56/208 |
| 3,643,407 | 2/1972 | Hubbard et al. | 56/208 |
| 3,736,737 | 6/1973 | Schumacher et al. | 56/208 |
| 3,906,710 | 9/1975 | Pask | 56/208 |

Primary Examiner—Russell R. Kinsey
Attorney, Agent, or Firm—Steinberg & Blake

[57] ABSTRACT

Control device for guiding a hydraulically operated cutter mechanism of a harvesting machine, particularly a combine harvester, at a preselected height above the ground, said cutter mechanism being connected via a connecting member and two series-connected spring elements to a stationary portion of the harvesting machine, the spring force of at least one of said spring elements being preselectable by means of an adjustment lever, while between said spring elements a switching member is arranged which depending on the position thereof acts on a switch actuating either a raise valve or the lower valve of the lifting cylinder or takes a neutral position, wherein said two spring elements connected with one of their ends to said cutter mechanism are connected via said connecting member to said adjustment lever provided on the stationary portion of said combine harvester.

18 Claims, 8 Drawing Figures

CONTROL SYSTEM AND METHOD FOR COMBINE HARVESTERS

The invention relates to a control device and a method for guiding a hydraulically operated cutter mechanism of a harvester, particularly a combine harvester, at a preselected height above the ground.

An electro-hydraulic control system has been proposed with the aid of which it is possible to keep the cutter mechanism during the operation at a preselected relative position relative to the chassis of the combine harvester while on the other hand it is possible to overdrive this preselected value if necessary by hand whereby the cutter mechanism will return into the preselected relative position.

In accordance with this proposal, the cutter mechanism is connected via a connecting member and two series-connected spring elements to the stationary portion of the harvesting machine, the spring force of at least one spring element can be preselected by means of a lever, and between the spring elements a switching device is arranged which depending on the position thereof acts on a switch actuating either a raise valve or the lower valve of the cylinder or takes a neutral position.

If the cutter mechanism is operated without touching the ground in the preselected relative position relative to the stationary portion of the harvester chassis, the cutter mechanism can be so overdriven by a second layer that it is positioned either higher or lower relative to the preselected relative position for the time of the overdriving. After the termination of the overdriving by the second lever, it is either automatically lowered from the more elevated position to the preselected relative position, if the second layer is returned into its zero position, or if it had been set in a lower position, it is automatically raised to the preselected relative value if the second lever returns from the lowering position into the zero position.

In the practical operation of this control system, several difficulties have been encountered. The spring elements, which on one hand are suitably connected to the stationary portion of the harvesting machine via a lever and on the other hand are connected via a control cable, a control chain or the like to the cutter mechanism and between which the switching member is arranged which depending on its position acts on a switch actuating either the raise valve or the lower valve of the cylinder, are quite considerably affected by the frictional resistances occurring between guide rollers, guide eyes, and the like and the control cable or the control chain, respectively. These values do not constitute a constant factor which can be eliminated by adjusting, rather these frictional resistances undergo certain changes in the course of the time so that the relative position adjusted at the lever (cutter mechanism height above the ground) will not remain constant.

When returning the cutter mechanism from the elevated or the lowered position to the preselected relative position, the two switches actuated by the switching member arranged between the two spring elements should be arranged as near to each other as possible in order to avoid that the cutter mechanism, upon returning to the preselected relative value, will adjust to a practical value when lowered from the elevated position different to when it is raised from the lowered position.

The close side-by-side arrangement of these two switches, on the other hand, causes the cutter mechanism frequently to vibrate because of its inert mass, because it vibrates beyond the preselected position and thus actuates the neighboring switch which on its part triggers an impuls so that the cutter mechanism will swing into the opposite direction.

Such undesired swinging movements of the cutter mechanism are very disadvantageous as they lead, on one hand, to a damage of the cutter mechanism and of the mounting support thereof on the chassis, and have an extremely disadvantageous influence on the mowing process, on the other.

It is now the aim of the present invention to avoid the above described disadvantages and to further encrease the ease of operation of the combine harvester by means of an improved control system and method.

As a result of the numerous tests, it has found out that the difficulty, mentioned in the beginning, of the disadvantageous influence of the preselected relative value by the frictional resistances between control cable or control chain, respectively, and guide rollers or guide eyes, respectively, can in a simple way be overcome in accordance with the present invention in that the two spring elements secured to the one end of the cutter mechanism are connected via the connecting member to the lever secured to the stationary portion of the combine harvester.

If this sequence is kept, that is if the frictional resistances of the control cable act on the same spring end as the lever, the disadvantageous consequences of these frictional resistances are largely eliminated.

In normal operation, the control device according to the invention fulfils all the requirements and adjusts the cutter height automatically to the given ground conditions.

When turning, the cutter mechanisms must be lifted, while on the other hand it must be lowered when moving grain which lies on the ground. These manipulations can simply be made with the aid of the lever for the preselection of the relative position. However, it has been found to be suitable if in accordance with the present invention an additional control possibility (hand control) by an additional lever is provided with the aid of which the length control and/or the weight control can arbitrarily be overdriven by hand.

The additional hand control makes possible a direct actuation of the raise as well as of the lower valve in order to set the desired position of the cutter mechanism while on the other hand upon resetting the hand lever into the zero position the length control causes an automatic return of the cutter mechanism into the preselected relative position.

In certain cases, particularly if the cutter mechanism is replaced, the difficulty may arise in a combination of length control and weight control that the inclined conveyor of the combine harvester has no longer the weight to fulfil the switching functions which are particularly dependent on the weight.

In order to make possible a lowering, or raising, respectively, of the inclined conveyor with the cutter mechanism taken off, which is a necessity when mounting and when replacing the cutter mechanism, there have been provided, in accordance with a further embodiment of the present invention, additional switching means which make possible, if necessary, the switching on and off of the weight control which depends on the weight of the cutter mechanism supported by the hydraulic cylinder.

By actuating these switching means, a switch-off of the weight control is possible; even with the weight of the cutter mechanism missing, arbitrary lifting and lowering of the remaining inclined conveyor is possible.

The same result is obtained with the aid of another advantageous embodiment of the present invention in that a time delay member is provided in one of the circuits formed by a switch of the length control and the associated electromagnetic valve for the control of the hydraulic raise cylinder. Such a time delay member delays in the case of a switch-on of the neighboring switch the execution of the control signal triggered by this switch and thus an influence on the swinging movement of the cutter mechanism via the raise cylinder.

It has proved to be extremely useful in practical operation if the hand lever for the arbitrary actuation of the cutter mechanism control is made as a four position switch having a separate zero position. The hand lever is preferably provided as a cross selection switch.

A further embodiment of the hand lever which is also suitable is a series switch.

While using a hand lever so shaped, it has been arranged in accordance with a further advantageous embodiment of the present invention to provide in addition to the switch position for the lifting of the cutter mechanism and to the switch position for the lowering of the cutter mechanism, a separate position for the returning of the cutter mechanism from the raised position and a further position for the returning of the cutter mechanism from the lowered position into the preselected relative position.

By providing such an embodiment it is possible to safely avoid vibrations of the cutter mechanism as the neighboring length control switch is deenergized as long as the particular switching position for the returning of the cutter mechanism from an arbitrarily set position is actuated.

In accordance with a further advantageous embodiment of the present invention, one or a plurality of foot-operated switches are provided which replace, wholly or partly, the functions of the hand lever.

Such an embodiment may be very useful in modern combine harvesters, the travelling speed of which is hydrostatically controlled and where the corresponding operating lever must be actuated by the driver with one hand. As the driver has to operate the steering wheel with the other hand, he finds it particularly difficult when turning at the edge of an acre to actuate, additionally and at the same time, by hand, the height adjustment of the cutter mechanism.

In accordance with a further particularly advantageous and simplified embodiment of the present invention, the switching member arranged between the two spring elements acts only on one electric switch which is series connected together with the weight control switch associated with the lower valve.

In such an embodiment, the lowering process is interrupted via the switching member of the weight control while the resetting to the preselected relative value is so made that the cutter mechanism is lifted above this relative value and is then lowered. Such an embodiment of the present invention is somewhat more complicated in the operation, however it safely avoids a vibration of the cutter mechanism because of the alternate actuation of raise valve and lower valve through the length control switches.

It has proved to be of advantage if the automatic operation provided by the length control, on one hand, and by the weight control, on the other, is switched off in certain cases and can be replaced by pure hand control.

The process of the invention is characterized in that the height adjustment is provided by the control of the hydraulic lifting cylinder as a function of the preselected length of a mechanical connecting member between the cutter mechanism and a fixed point of the harvester and the weight of the cutter mechanism carried by the hydraulic cylinder.

The employment of these variable magnitudes for the control of the cutter mechanism yields, contrary to the control methods hitherto known, substantial advantages which can convincingly be proved in practical operation.

Further advantages will be encountered when in the process of the invention, in order to adapt to changed operation conditions, the control of the hydraulic cylinder which depends on the preselected length and the weight, is arbitrarily overdriven by hand.

Further advantages will be encountered if, in the process of the invention, different switching positions are used for the lowering to the preselected value and for the raising to the preselected value, as in this way the vibration of the cutter mechanism caused by the alternate actuation of the switches acting on the raise and the lower valve, particularly if the length control switching members are closely adjacent to each other, is avoided.

Figure 2:
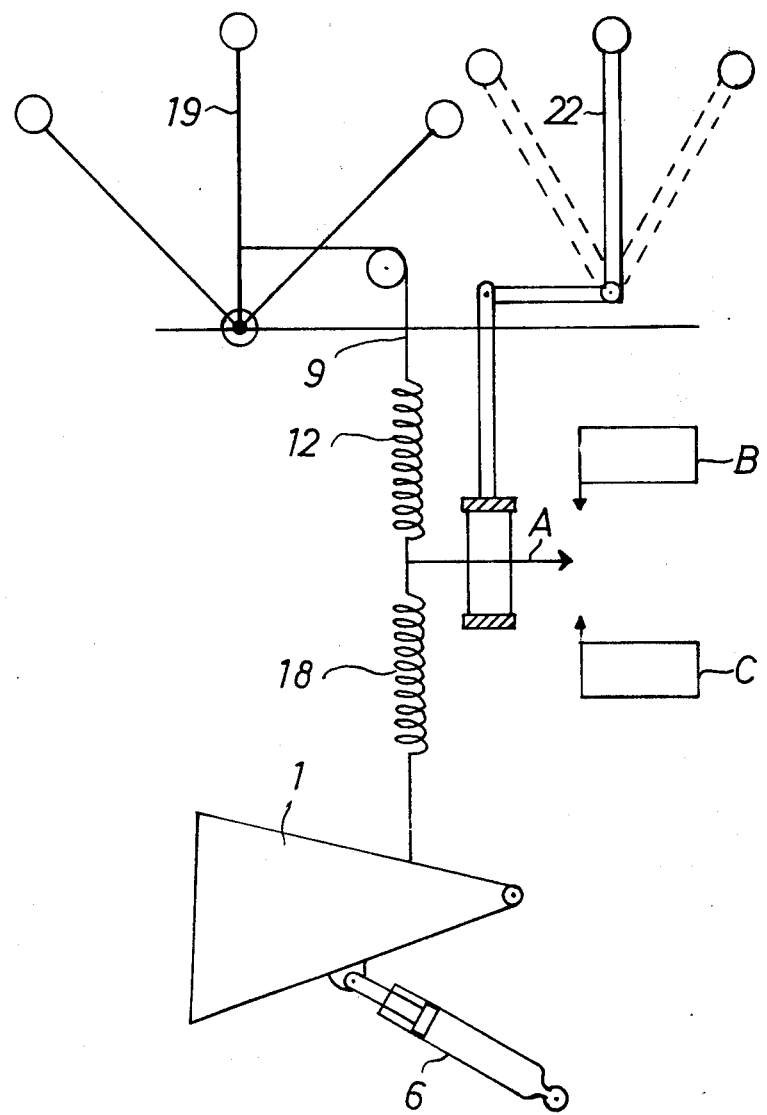
Figure 3:
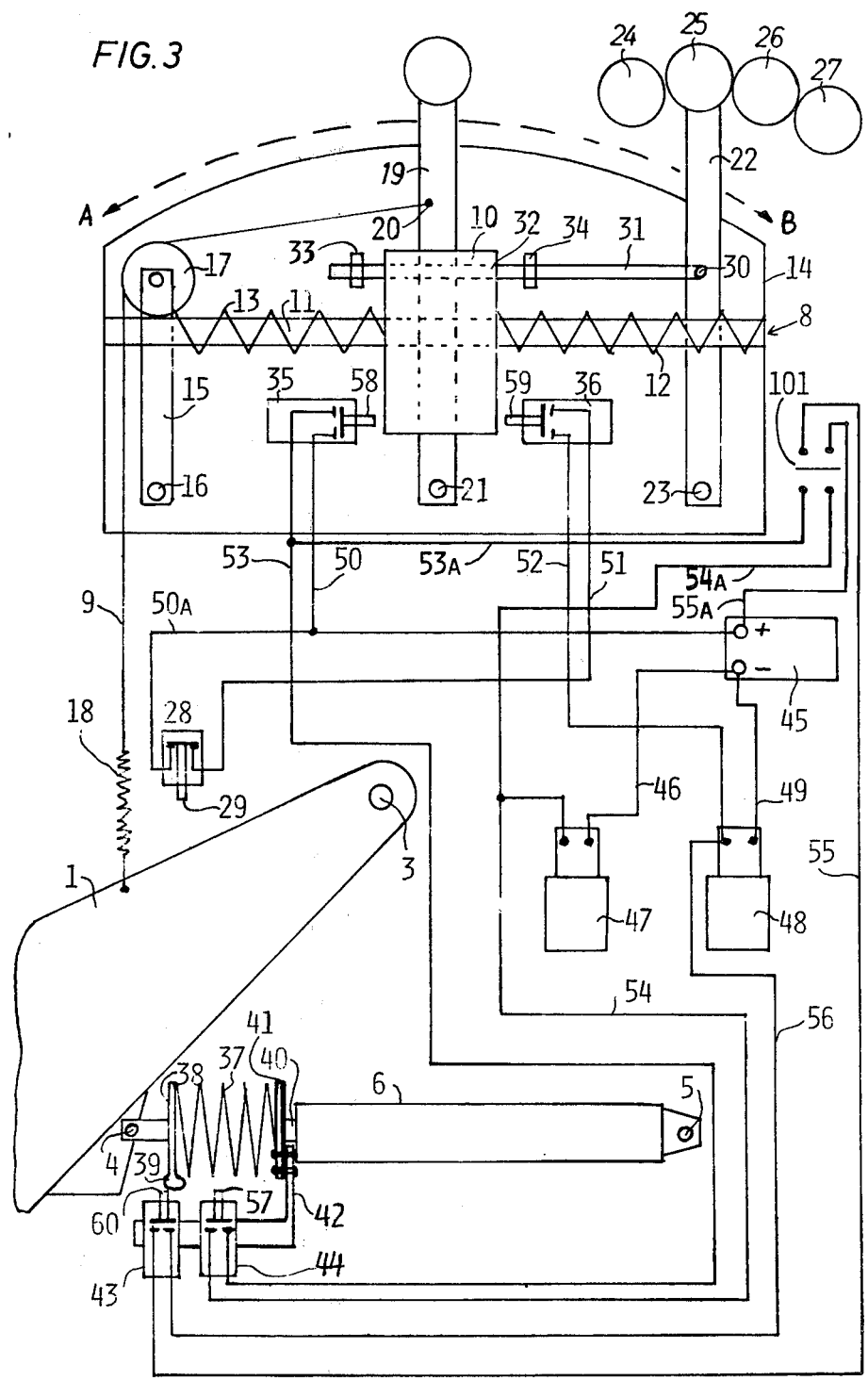
Figure 4:
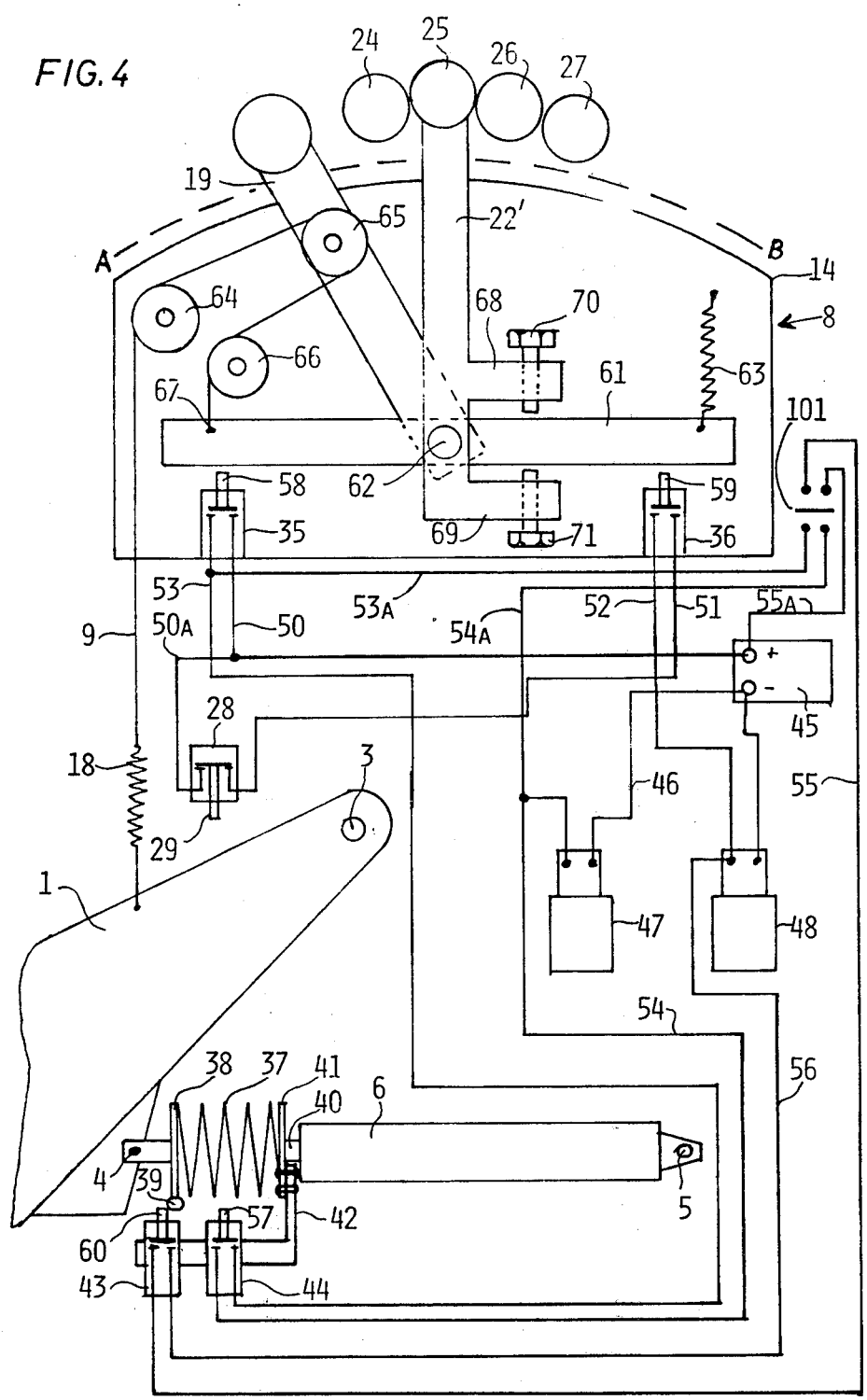
Figure 5:
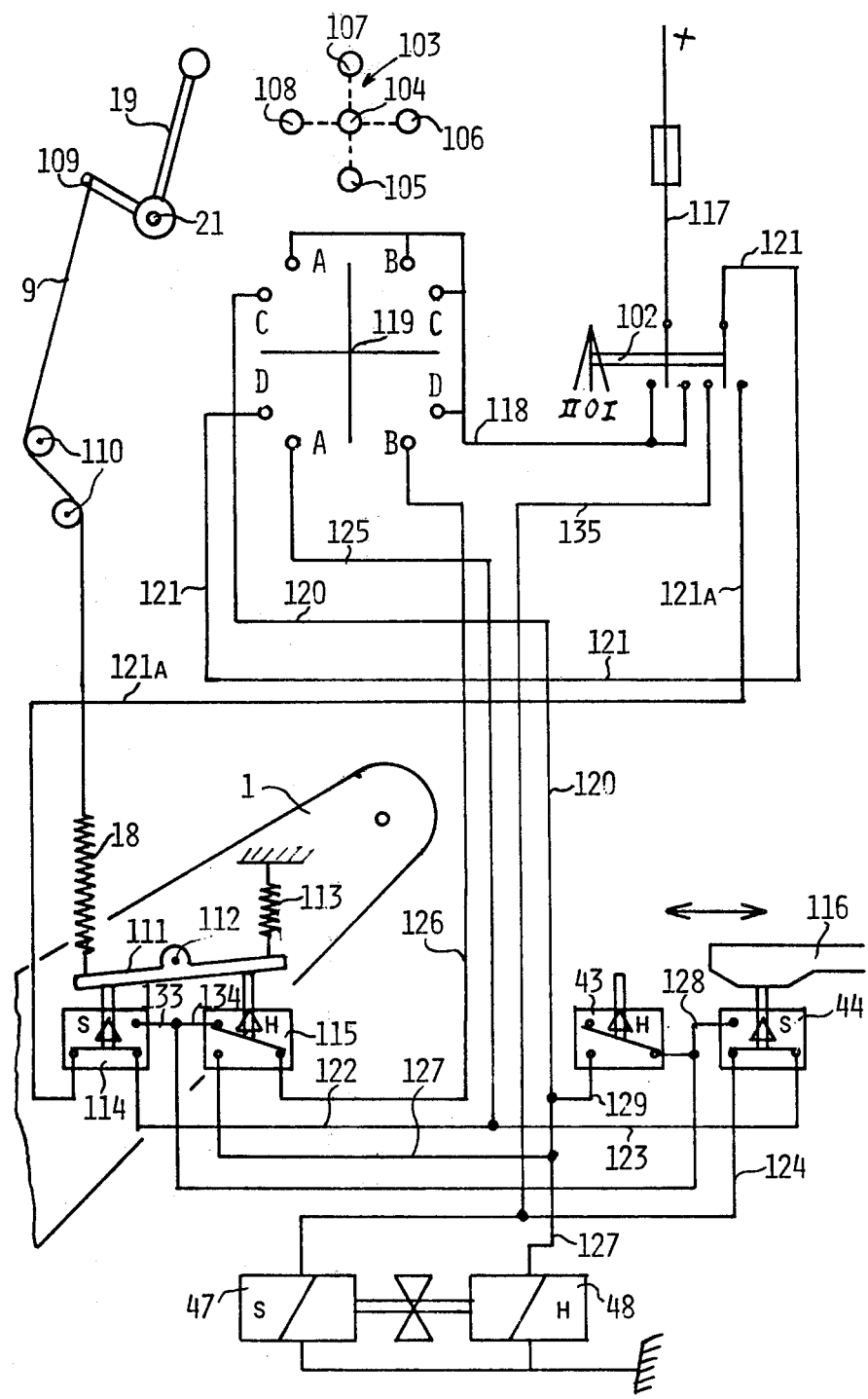
Figure 6:
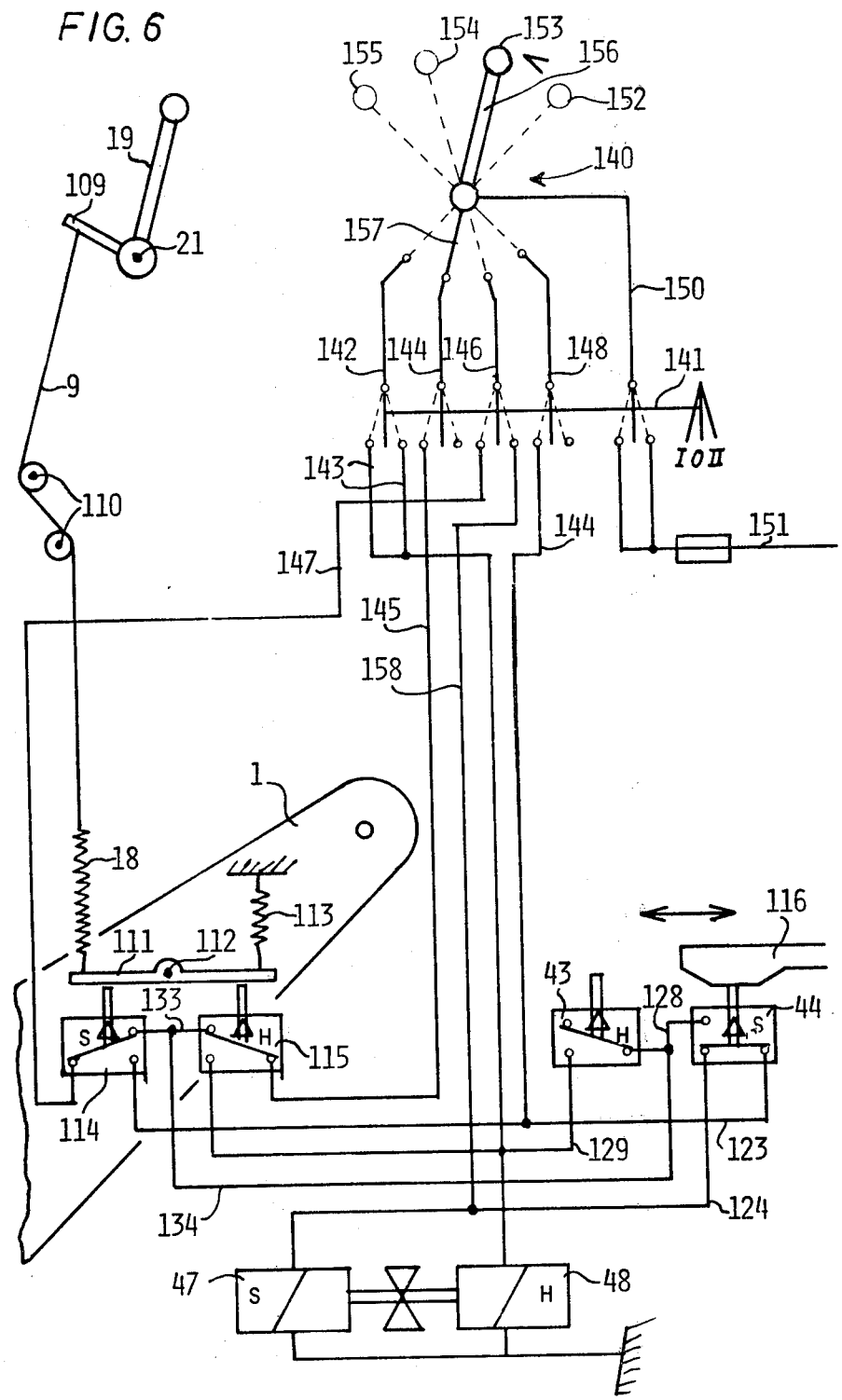
Figure 7:
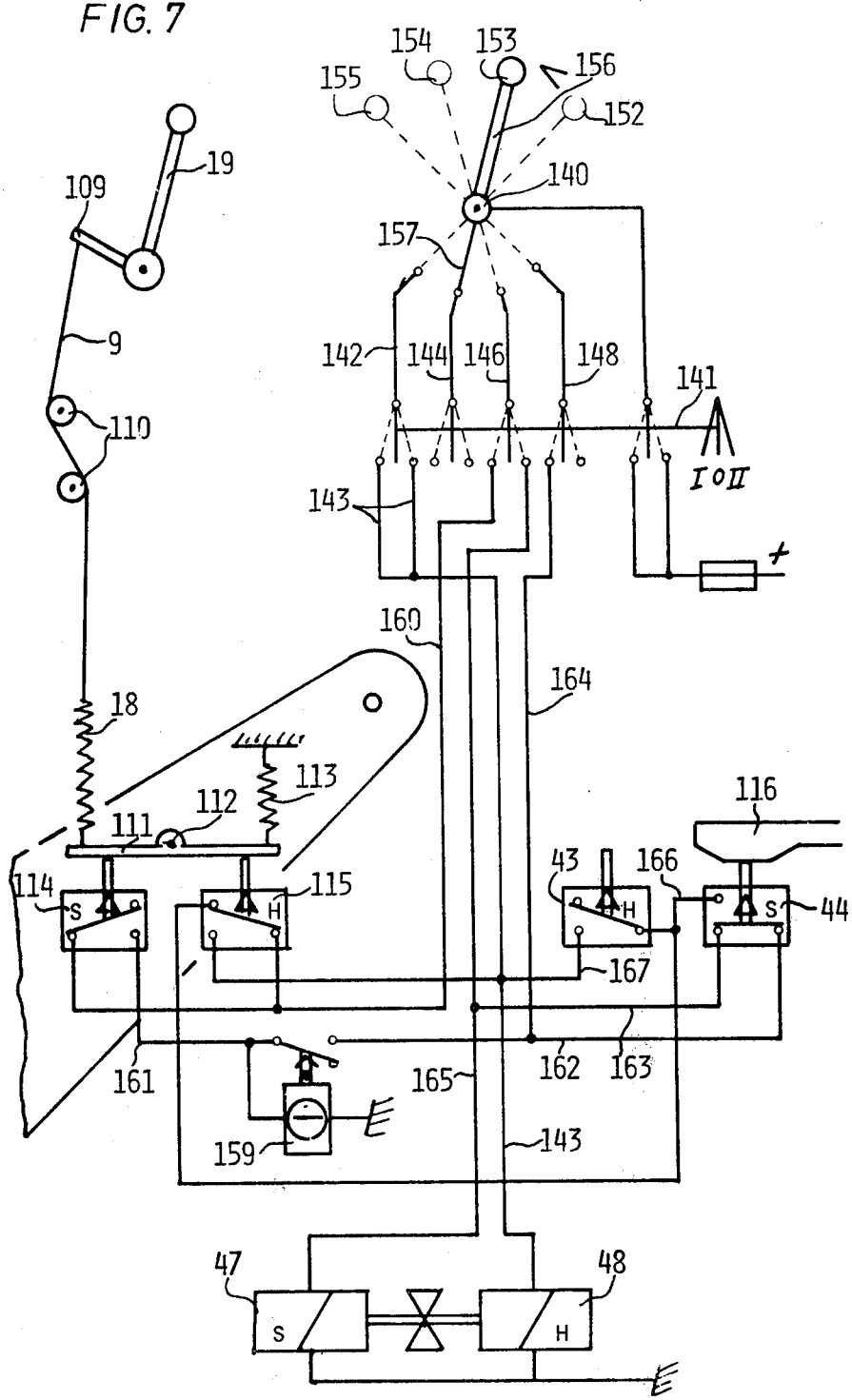
Figure 8:
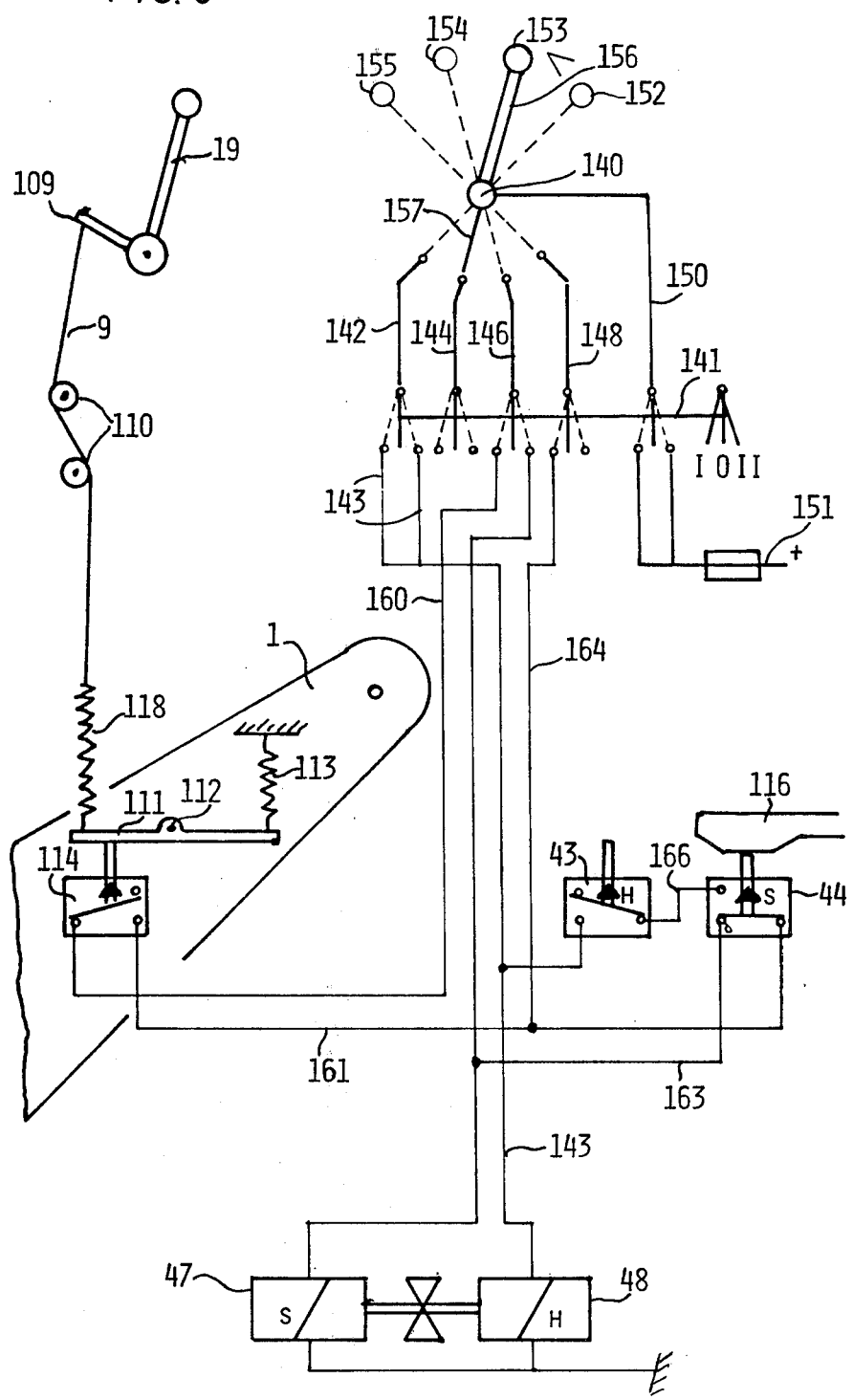

The invention will be more readily understood from the following description of the embodiments thereof given by way of example with reference to the accompanying drawings, in which FIG. 1 is a fragmentary view of a combine harvester in a simplified representation, FIG. 2 is a simplified schematic view of the switching system, FIG. 3 is a schematic view of an embodiment of the control device of the invention, FIG. 4 is a schematic view of a further embodiment of the control device of the invention, FIG. 5 is the circuit diagram of an embodiment of the control device of the invention including a cross selection switch, FIG. 6 is the circuit diagram of an embodiment of the control device of the invention including a series switch, FIG. 7 is the circuit diagram of an embodiment of the control of the invention including a time delay member, FIG. 8 is the circuit diagram of a further embodiment of the control device of the invention showing a simplified structure.

The combine harvester depicted in FIG. 1 in a fragmentary view includes cutter mechanism 1 pivotally supported, at 3, on chassis 2 of the combine harvester. Hydraulic cylinder 6 secured, at 4, to the cutter mechanism and, at 5, to chassis 2 of the combine harvester determines the ground clearance of the cutter mechanism. On the driver's platform of the combine harvester, and thus on the stationary point, control device 8 is mounted and is connected via cable 9 and tension spring 18 to cutter mechanism 1.

In the schematic illustration shown in FIG. 2 of the switching system according to the invention, cutter mechanism 1 is connected via cable 9 and the two series-connected tension springs 12 and 18 to actuation lever 19. Between the two tension springs 12 and 18, there is provided switching device A which takes either a neutral position or, under the influence of one of the two tension springs, an upper or a lower switching position and actuates either the switch for lower valve B which brings about lowering of the cutter mechanism or the switch for raise valve C which brings about raising of the cutter mechanism. Independently from the cutting height of cutter mechanism 1 adjusted by actuation lever 19, the position of switching device A may be altered by means of additional actuation lever 22 so that by actuating switch B further lowering of the cutter mechanism is effected or by actuating switch C the cutter mechanism is raised. If actuation lever 22 is returned to its neutral position, the cutting height preselected by lever 19 will automatically be adjusted as a consequence of the spring equilibrium between the two tension springs 12 and 18, in that because of an unbalanced spring force the switching device will as long actuate the other switch until the cylinder has moved the cutter mechanism again into the preselected position and switching device A will return to the neutral position.

In FIG. 3 there is shown a particular embodiment of the control device according to the invention as well as, in a schematic view, the switching system. The cutter mechanism is connected via tension spring 18, cable 9, and roller 17 to lever 19. Lever 19 is pivotally supported, at 21, and can either continuously or in increments be moved over the total range A − B of control device 8. Lever 19 is connected to slide 10 glidingly supported on guide shaft 11 and is acted upon by compression spring 12 on one side thereof and by compression spring 13 from the other side thereof. Compression spring 12 presses on one side against housing 14. Compression spring 13 is secured to lever 15 which is pivotally supported at 16. At the movable end of lever 15, roller 17 is rotatably secured. A second lever 22 is pivotally supported at 23 and has four adjustment possibilities respectively illustrated at 24, 25, 26, and 27. For clarity reasons, only the corresponding positions of the operating knob are shown. In all these positions, actuation lever 22 is lockable by detents and can easily be shifted by hand to another stop location.

Switching bar 31 is pivoted, at 30, to actuation lever 22. This bar leads through bore 32 of slide 10 and has on its left side an adjustment ring 33 and on its right side an adjustment ring 34. In accordance with the setting of actuation lever 22, the adjustment rings press against slide 10 and thus affect the position thereof. In the range of influence of slide 10, electric switch 35 is arranged on the left side and electric switch 36 is arranged on the right side.

Between lifting cylinder 6 and cutter mechanism 1 there is provided a compression spring 37. On support plate 38, there is provided a switching cam 39. Compression spring 37 presses against a support plate 41 secured to piston rod 40 of the hydraulic piston. To this support plate 41, there is secured a holder 42 to which electric switches 43 and 44 are fastened.

On a stationary portion of the combine harvester so installed that it is reached by cutter mechanism 1 in the uppermost position thereof, there is provided electric switch 28. In contrast to the remaining switches of the electric system, it has a contact which is closed in the normal position.

The electric system is fed by battery 45. From the minus terminal of this battery, there is one lead 46 to magnetically operated lower valve 47 and another lead 49 to raise valve 48 which is also magnetically operated. Switch 35 receives the electric voltage from the plus terminal of battery 45 via the lead 50 while switch 36 is fed with current via lead 50a, normally closed switch 28, and lead 51. Lead 52 runs from switch 36 to magnetically operated raise valve 48 and lead 53 runs to switch 44 from which again an electric lead 54 runs to lower valve 47. Finally, lead 55 runs from the plus terminal of battery 45 to switch 43 and therefrom a further electric lead 56 runs to raise valve 48.

The mode of operation of the control device shown in FIG. 3 is as follows:

If the cutter mechanism is raised, the weight thereof is supported via spring 37 by piston rod 40 of cylinder 6. Because of the weight of the cutter mechanism, spring 37 is completely compressed. Frontplate 38 has moved so far to the right that cam 39 is above push rod 57 of switch 44 and actuates it. Leads 53 and 54 are thus connected in switch 44.

In the position shown of lever 19, cable 9 is loaded as the cutter mechanism is not supported on the ground. By this tension, cable 9 presses lever 15 via roller 17 to the right and spring 13 displaces slide 10 also to the right contrary to the spring force of compression spring 12. This is why slide 10 cannot actuate push rod 58 of switch 35. The current flow to electromagnetically operated lower valve 47 is therefore interrupted.

If lever 19 is moved into the direction A, cable 9 relaxes. The pressure upon roller 17 by which lever 15 was displaced to the right is released and spring 13 expands force relative to slide 10. Compression spring 12 can expand, and displaces slide 10 to the left against push rod 58 of switch 35. The current circuit to lower valve 47 is thus closed, and the latter switches to "lower", or in other words to bring about lowering of the mechanism 1. If the cutter mechanism touches the ground, the pressure upon spring 37 is released. The latter expands and cam 39 releases push rod 57 of switch 44 and opens the current circuit to the lower valve. The latter switches, in a manner known per se, to the neutral position.

If the cutter mechanism is to be lifted by means of lever 19, the latter is moved into direction B and is fixed in this position. Cable 9 is tightened and displaces via roller 17 the lever 15 to the right. The tension of spring 13 is so increased that it tries to press slide 10 contrary to the compression force of spring 12 so far to the right that push rod 59 of switch 36 is actuated. This however is not possible in position 25 of lever 22 as slide 10 engages adjustment ring 34. If now the cutter mechanism is to follow the relative position adjusted on lever 19, lever 22 must be switched into the lockable position 26. Adjustment ring 34 is taken, via switching rod 31, so far to the right that switching slide 10 can actuate switch 36.

If the cutter mechanism has been raised to the height preselected by lever 19, cable 9 relaxes so far that the pressure via roller 17, lever 15, and spring 13 to slide 10 is released so far that spring 12 displaces slide 10 again away from push rod 59 to the left. The current circuit to raise valve 48 is disconnected and the latter switches to its neutral position.

In practical mowing operation it can frequently be experienced that for instance in a regular field there are a few spots where a crop is lying on the ground. If the cutting height of the crop is to be 20 cm, this value is adjusted by means of lever 19. If there is now a spot where the crop is lying on the ground, the cutter mechanism must be lowered closer to the ground for a short time. In this case, the operator moves the additional actuation lever 22 into position 24. Switching rod 31 is moved to the left and adjustment ring 34 displace slide 10 contrary to the spring force of compression spring 13 so far to the left that push rod 58 of switch 35 is actuated and the electric leads 50 and 53 are connected with one another within switch 35. As in the raised state of the cutter mechanism cam 39 holds down push rod 57 of switch 44, the current circuit to lower valve 47 is closed and the latter switches to "lower". As soon however as the cutter mechanism bears upon the ground, cam 39 leaves push rod 57 because of spring 37 which is now expanding. The current circuit to lower valve 47 is interrupted and it switches into the neutral position.

The cutter mechanism is lowering by means of the additional actuation lever 22, and tension spring 18 is loaded considering that, as has been mentioned above, adjustment lever 19 had been adjusted to a cutting height of 20 cm. If the crop which was lying on the ground has been harvested, the operator moves actuating lever 22 from position 24 into position 25. Position 25 is omitted as in this position switching slide 10 cannot actuate switch 36 and therefore does not switch to "raising". Tension spring 18 biased by the lowering displaces, via cable 9, roller 17, lever 15, and spring 13 the slide 10 so far to the right that push rod 59 of switch 36 closes the latter and, via leads 51 and 52, the current circuits to the valve 48 is closed. It switches to raising and feeds the necessary pressure means to cylinder 6. The cutter mechanism is raised until spring 18 is unloaded and thus the pressure upon slide 10 decreases so that it releases push rod 59, and the lifting process is discontinued. In this way, the cutter mechanism has adjusted itself to the cutting height selected with the aid of lever 19.

When at the end of the field the cutter mechanism must be lifted in order to turn the combine harvester, the cutting height preselected by lever 19 remains fixed. The operator moves only additional actuation lever 22 into position 27. By so doing, switching rod 31 is drawn to the right and adjustment ring 33 secured thereto presses slide 10 to the right against push rod 59 of switch 36. The current circuit to raise valve 48 is closed and it switches to raising. Cable 9 relaxes and the pressure on spring 13 via roller 17, and lever 15 is decreased.

If the cutter mechanism has reached a sufficient height in order to move over any obstructions at the edge of the field, actuation lever 22 is locked in position 26. Adjustment ring 33 allows slide 10 to glide so far to the left that it releases push rod 59. Raise valve 48 switches into its neutral position.

The operator can however also leave actuation lever 22 in position 27. In this case, cutter mechanism 1 is raised that much that it hits against push rod 29 of switch 28. Switch 28 closed in the normal position discontinues current supply to switch 36 and thus the current circuit to raise valve 48 which thereupon switches into the neutral position.

If the cutter mechanism is to be lowered for the new cutting operation, actuation lever 22 is moved again into position 25. Adjustment ring 33 permits slide 10 to glide to the left so that push rod 58 of switch 35 closes the latter. As through the lifting of the cutter mechanism cable 9 is unloaded, glide 10 will not receive a pressure, via roller 17, lever 15, and spring 13, from this side until cable 9 is streched by the lowering of the cutter mechanism, that is when in the present example the height of 20 cm has been reached. In this case the pressure exerted via roller 17, lever 15, and spring 13 on glide 10 is increased and the latter will release push rod 58. The lowering process is discontinued.

If the cutter mechanism is to be guided glidingly over the ground, because, for instance, a whole acre of crop has to be mown, lever 19 is moved into its left position, i.e. into direction A. As has already been described, the device switches to lowering, as switching cam 39 actuates push rod 57 of switch 44. If the cutter mechanism is supported on the ground, spring 37 is unloaded and cam 39 releases push rod 57. The current circuit to the lower valve is discontinued and it switches into its neutral position and thus finishes the lowering process. The cutter mechanism now glides elastically over the ground with a remaining weight determined by the force of spring 37 in connection with the weight of the cutter mechanism.

If the cutter mechanism is lifted by a bump in the ground, spring 37 expands and cam 39 actuates push rod 60 of switch 43. The latter closes the current circuit to raise valve 48 and switches it to lifting. The pressure means is fed to cylinder 6 and cutter mechanism 1 is lifted. By the increasing pressure in the cylinder, spring 37 is compressed again until the cam releases push rod 60 and switches raise valve 48, via switch 43, into its neutral position. When the bump on the ground has been passed or when cutter mechanism 1 moves over a depression, the pressure on spring 37 is encreased. Cam 39 moves to the right and actuates push rod 57 of switch 44. As cable 9 is unloaded since lever 19 has completely been set to the left into the direction A, slide 10 holds push rod 58 of switch 38 permanently pressed down. Leads 50 and 53 are therefore connected with one another. Push rod 57 can therefore close, in switch 44, the current circuit to lower valve 47 and the latter lowers cutter mechanism 1 so far until spring 37 relaxes again and cam 39 releases again push rod 57 of switch 44.

When the combine harvester is travelling on a road, the cutter mechanism must often be removed. In such a case, the weight on spring 37 is missing. The latter has expanded and the cam keeps switch 43 closed. Switch 43 switches to lifting and the cutter mechanism portion 1 remaining on the combine harvester is lifted that far until switch 28 is actuated thus disconnecting the current circuit to raise valve 48.

In order to raise, or lower, respectively, the remaining cutter mechanism portion, termed "inclined conveyor" in the following, switch 101 has been provided. The latter disconnects, in a first switching position, leads 55 and 55a and thus the connection from battery 45 to switch 43 and connects electric leads 54a and 53a instead. Switch 43 receives no current and therefore cannot switch on the lifting process. By the fact however that leads 53a and 54a have been connected with one another, lower valve 47 receives current as soon as switch 35 is actuated via push rod 58. In accordance with the invention, switch 44 need not be closed.

Through switch 101 provided in the embodiment shown in FIG. 3, the hydraulic system can, independently from the weight of the cutter mechanism, be switched to lifting and lowering, respectively, with the aid of lever 22 alone.

FIG. 4 shows a further embodiment of a control device according to the invention. In this case, a rocker lever 61, the adjustment lever 19, and the additional actuation lever 22' are separately pivotally supported on a common shaft 62.

Tension spring 63 acts on rocker lever 61 in such a manner that push rod 58 of switch 35 is actuated. The force of tension spring 63 acts via roller 64, reversing roller 65, and roller 66 opposite to the force of tension spring 18 which holds cable 9 under tension. Cable 9 is secured at 67 to rocker lever 61.

Switch legs 68 and 69 are fixedly connected to actuating lever 22. Adjustment screws 70 and 71, respectively, are provided in the legs which depending on the position of actuation lever 22 can act upon rocker lever 61. If adjustment lever 19 is moved into direction A, cable 9 relaxes and spring 63 has the chance to press rocker lever 61 against push rod 58 of switch 35. The cutter mechanism is thereby switched to bring about lowering.

If lever 19 is drawn into direction B, the tension of cable 9 is increased and rocker lever 61 is pressed contrary to the force of tension spring 63 to push rod 59 of switch 36. This has the consequence that the raise valve is switched on, the cutter mechanism is lifted when adjustment lever 22 is set into position 26.

Independently from the cutting height of the cutter mechanism adjusted by adjustment lever 19, rocker lever 61 can be displaced by additional actuation lever 22' via switch legs 68 and 69. When the additional actuation lever 22' is moved into position 24, switch leg 69 presses via adjustment screw 71 from below gainst rocker lever 61 and presses it opposite to the bias formed by spring 18 on cable 9 against push rod 58 of switch 35 and thus switches to lowering. The lowering process however is discontinued when the cutter mechanism touches the ground, the spring 37 expands, and cam 39 releases push rod 57 thus discontinuing the current supply to the lower valve.

If now the additional actuation lever 22' is moved into position 27, switch leg 68 presses, via adjustment screw 70, rocker lever 61 contrary to the spring force of tension spring 63 downward and on the push rod of switch 36 which on its part switches on the raise valve. If actuation lever 22' is moved into position 26, the lifting process is interrupted, the lowering process however is not yet released.

With the aid of the embodiment of the control device according to the invention shown in FIG. 4 the other switching procedures described in connection with FIG. 3 may be performed, too.

In this embodiment, there is provided, similar to FIG. 3, a switch 101. This switch interrupts, in a first switching position, leads 55 and thus the connection from battery 45 to switch 43 and connects electric leads 54a and 53a instead. Switch 43 does not receive current and therefore cannot switch on the lifting process; on the other hand, the switch closes leads 53a and 54a so that lower valve 47 triggers, on actuation of switch 35, the lowering process although switch 44 is not closed. In accordance with the invention, lifting and lowering of the cutter mechanism can be performed, also in this embodiment, independently from the weight of the cutter mechanism, by actuation of adjustment lever 22.

A further development of the subject matter of the invention is shown in FIG. 5. If elements are concerned which have been described in the foregoing examples, they are provided with the same reference numerals.

On the control panel, there is provided switch 102 having the circuitry as shown. In the O position, the whole system is switched off. In position I, it is switched to automatic control and in position II control is done by hand, that is all automatic operations are switched off. This is necessary to lower, or to lift, respectively, the inclined conveyor when the cutter mechanism has been taken off.

Also on the control panel, there is provided the five position switch 103 having the switching positions 104 as the zero position, 105 as the locked lift position, 106 as the locked "automatic" position, 107 as the "Position One", and 108 as the "Position Two". Within easy reach of the driver, on the driver's platform, there is provided adjustment lever 19 pivotally movable with considerable resistance at 21. From lever arm 109 rigidly connected to adjustment lever 19, the cable, the chain, or the like, 9, which for structural reasons can be conducted via one, or a plurality of, reversing rollers 110 or guide eyes, is conducted to rocker arm 111, rockably mounted, at 112, on inclined conveyor 1, while spring 18 is inserted therebetween. Spring 113 is secured to inclined conveyor 1 and tries to tilt the rocker arm counter-clockwise.

The two switches 114 and 115 are also secured to the inclined conveyor so that the actuation push rods thereof are actuated depending on whether rocker arm 111 is tilted clockwise or counter-clockwise.

Switching cam 116 schematically shown is correspondingly moved to and fro depending on whether the spring elements (not shown) provided for the shock absorption of the cutter mechanism will expand or are pressed together by the weight of the cutter mechanism. The switching cam actuates switch 44 for "lowering" and switch 43 for "lifting". The hydraulic control valve is switched by switching magnet 47 to "lowering" and by switching magnet 48 to "lifting". If none of the magnets is switched on, the hydraulic valve is in the neutral position. In the embodiment shown in the circuit diagram, the cutter mechanism is lifted above the ground and all the switches are in the neutral position. In order to put the apparatus into operation, switch 102 is switched into its position I "Automatic". The current from the battery via lead 117 is conducted into lead 118 and feeds switch 103, and leads 121 and 121a are connected with one another. If now the knob of switch 103 is moved into position 105, the circuit C—C is closed. The switching positions shown of the knob in switch 103 are each contrary to the associated circuits in the switching cross as the servicing lever is tilted around a pivot point. The current flows via lead 120 to magnet 48, and the cutter mechanism raises as long as the operator holds the switching lever in position 105.

With the aid of adjustment lever 19, the desired relative position of the cutter mechanism relative to the chassis of the combine harvester is fixed. By lifting the cutter mechanism, cable 9 has relaxed. If the cutter mechanism is to be lowered to the desired relative position, switch 103 is locked into its position 107. Thereby, the current path D—D is closed and lead 121 and 121a are provided with current which flows to switch 114. By relaxing cable 9, spring 113 has actuated switch 114 via rocker lever 111, the current can flow through lead 122 and 123 to switch 44 and, as the latter is closed by switch cam 116 in the elevated state of the cutter mechanism, it will continue to flow via lead 124 to lower valve 47.

The cutter mechanism is now lowered until cable 9 tightens and lifts rocker lever 111 from switch 114. The latter disconnects leads 121a and 122, and the current supply to lower valve 47 is interrupted. The cutter mechanism will not be lowered further.

If now a low-lying crop is to be mown and the cutter mechanism is to be lowered, contrary to its adjusted relative position, until the ground is touched, without changing the adjusted relative position on adjustment lever 19, switch 103 is locked into position 106 for "Automatic". In this case, the current path A—A is closed. The current will now flow through leads 125 and 123 to switch 44.

As the cutter mechanism is still hanging at this time, switch cam 116 holds switch 44 closed, and lower valve 47 is actuated via lead 124. The cutter mechanism is lowered, and the cable 9 now tightening tilts rocker lever 113, contrary to the spring force of spring 113, in a clockwise direction. Switch 115 is switched over so that leads 126 and 127 are connected. So far however, they are currentless.

If the cutter mechanism touches the ground, the shock absorbing elements will expand. Cam 116 leaves the push rod of switch 44 and moves to the left. Switch 44 switches over, disconnects leads 123 and 124, and connects leads 123 and 128. By the disconnection of leads 123 and 124, the lowering process is interrupted.

If the cutter mechanism runs against an irregularity on the ground, cam 116 is moved further to the left until it actuates switch 43. Leads 128, 129, 127, and 120 are connected and provided with current by switched-on switch 43. Magnet 48 switches to "lifting". The cutter mechanism is lifted until the weight supporting on the lifting cylinder, or cylinders, respectively, is so great that cam 116 moves away from switch 43 to the right and the lifting process is interrupted.

If now the cutter mechanism is to be raised again to the relative height preselected with the aid of adjustment lever 19, switch 103 is locked into position 108 = "Position Two". The current path A—A is disconnected again and current path B—B is closed.

By lowering the cutter mechanism, the change in the length of cable 9 has been absorbed by spring 18. The latter has now an overweight relative to spring 113 and holds switch 115 in such a position that leads 126 and 127 are connected with one another. The current flows now via the latter to raise valve 48 and the cutter mechanism is raised. By the lifting, spring 18 loses force until spring 113 lifts rocker lever 111 from switch 115. The lifting process is interrupted as soon as switch 115 disconnects the two leads 126 and 127.

The cutter mechanism has now been lifted to the height preselected on adjustment lever 19. Except in the 0 position of switch 103, switch 43 must always be provided with current if switch 102 is in position I so that switch 43 can switch to lifting if the cutter mechanism is in a relative position relative to the combine harvester but is adjusted very closely above ground and might accidentally run against an obstacle on the ground. Either current path D—D for "Position One" or B—B for "Position Two" of switch 103 can be closed. If D—D for "Position One" is closed, the current will flow via leads 121 and 121a to switch 114. In the shown circuit diagram of switch 114, leads 121, 121a, 122, and 123 to switch 44 are connected with one another. If the cutter mechanism runs against a wave in the ground, switch cam 116 will leave the push rod of switch 44. In response, the latter switches over and connects lead 123 to lead 128 whereby switch 43 is provided with current. If switch 114 is switched over, leads 121a and 133 are connected with one another. Switch 43 receives the current via leads 133 and 134.

If B—B for "Position Two" is closed, the current flows through lead 126 to switch 115 and in the switching position of switch 115 shown via lead 134 to switch 43. If switch 115 is switched contrary to the switching position as shown, the current flows via lead 127 to raise valve 48. Current supply to switch 43 is then not necessary.

If the cutter mechanism has been taken off, the spring elements on the combine harvester provided for the shock absorption of the cutter mechanism expand very much as only the inclined conveyor is attached to the combine harvester and only a fraction of the usual weight supports on the spring element. Switch cam 115 will, in this case, remain on switch 43 and keeps the lifting process switched on. The inclined conveyor however has to be lifted, or lowered, for the attachment, or detachment, respectively, of the remaining cutter mechanism. In this case, switch 102 is switched into position II.

Lead 121 is disconnected from lead 121a and connected to lead 135. If now current path D—D is closed, it receives, instead of the meaning "Position One", the meaning "Lowering". By-passing switches 44 and 114, the current flows via leads 121 and 135 directly to lower valve 47 as soon as switch 103 is switched into position 107. For attaching the cutter mechanism, the inclined conveyor 1 can now be lifted via position 105 of switch 103 and lowered via position 107.

In FIG. 6 a further embodiment of the present invention is shown. In place of the cross switch as described in the embodiment according to FIG. 5, a series connector 140 is provided which has four switching positions. Switch 141 has, in addition to the zero position, two switching positions where switching position I is provided for automatic operation and switching position II for hand control, if the inclined conveyor is either lowered or lifted with the cutter mechanism taken off. In the 0 position, the whole system is switched off. In the switching position I of switch 141, lead 142 is connected to lead 143, lead 144 to 145, lead 146 to 147, lead 148 to 149, and lead 150 to lead 151. Switch 140 has the locked position 152 for "lifting", the locked position 153 for "Position Two", the locked position 154 for "Position One", and position 155, locked as well, for "Automatic".

If adjustment lever 156 is locked into position 152, switching member 157 closes the current flow via leads 142 and 143 to raise valve 48. The cutter mechanism is lifted contrary to the relative position adjusted on adjustment lever 19 as long as adjustment lever 156 is kept in position 152. If the latter is set into position 153, the current flow to lead 142 and thus to raise valve 48 is disconnected and the cutter mechanism is no longer lifted. In position 153, switching member 157 passes the current to lead 144/145 and feeds switch 115. By the lifting process, cable 9 has relaxed and spring 113 has tilted rocker lever 111 to the left. Switch 115 remains in the circuitry as shown and the current flows via leads 133 and 134 to switch 43. In the lifted state of the cutter mechanism, switching cam 116 is in the position as shown. In these positions however, the current is passed neither to the raise nor to the lower valve. The cutter mechanism remains in the position whereever it is if adjustment lever 156 is moved from switching position 152 into switching position 153.

If now the cutter mechanism is to be lowered to the value adjusted on adjustment lever 19, adjustment lever 156 is switched to switching position 154. The current passes via switching member 157, leads 146 and 147 to switch 114. By the prior lifting process, cable 9 has relaxed and rocker lever 111 has been tilted to the left through the force of spring 113. Switch 114 switches over and the current flows via lead 123 to switch 144. The latter remains in the switching position as shown and the current flows via lead 124 to lower valve 47. This valve switches to "lowering". If the cutter mechanism has been lowered to the value adjusted on adjustment lever 19, cable 9 tightens and rocker lever 111 is tilted to the right. Switch 114 returns into the switching position as shown, and the lowering process is interrupted. As switch 115 does not receive current in the position 154 of adjustment lever 156, the lifting process cannot be switched on as well, even if by lowering the cutter mechanism and by tilting to the right of rocker lever 111 switch 115 has been switched over for a short time. This means that the cutter mechanism cannot provoque vibration by itself when the two switches 114 and 115 are energized and are alternately switched on through the inertia principle of the cutter mechanism.

If the cutter mechanism is to be lowered contrary to the relative position adjusted on adjustment lever 19, adjustment lever 156 is set into position 155. By switching member 157, the current is passed through leads 148, 149, and 123 to switch 144. As the cutter mechanism is pending, switching cam 116 is above switch 144 and holds the latter in the circuitry as shown. Via lead 124, the current flows to lower valve 47, and the cutter mechanism is lowered. As soon as the cutter mechanism touches the ground with a small portion of its weight, the spring elements thereof expand and cam 116 leaves switch 144. The latter switches over, disconnects leads 123 and 124, and connects leads 123 and 128. The current flows to switch 43, and the lowering process is interrupted.

If the cutter mechanism runs against a wave in the ground, the spring elements thereof expand further until switching cam 116 actuates switch 43.

The latter switches over and connects leads 128 and 129. Through these leads, the current flows to the raise valve and the latter switches to "lifting".

Now the cutter follws each ground wave with only a remaining weight. If the weight becomes greater because it runs over a hole, cam 116 switches switch 44; if the weight becomes lighter because the cutter runs against a ground wave, the cam switches off switch 43.

If now the cutter mechanism is to be lifted to the relative position adjusted on adjustment lever 19, adjustment lever 156 is moved into position 153. The current flows now again via leads 144 and 145 to switch 115. By the prior lowering, cable 9 has tightened and the change in the length thereof has been absorbed by spring 18. Thereby, the latter has obtained an overweight as compared to spring 113 and has tilted rocker lever 111 to the right. The latter switches switch 115 and the current flows through lead 129 to the raise valve 48. The cutter mechanism is lifted until the equilibrium of springs 118 and 113 has been restored again and switch 115 has switched over again into the switching position as shown in the diagram. Also in this case, the cutter mechanism cannot trigger the opposite switching pulse through the inertia principle, even if the rocker lever will actuate switch 114 for a short time, as the latter is currentless.

If the inclined conveyor 1 is to be lifted, or lowered, for attachment or detachment, respectively, and if for the actuation of switch 44 the weight of the cutter mechanism is missing, switch 141 is moved into position II. Only if switch 140 is in position 152, lead 143 will receive the current, and only if in position 154, lead 158 will be provided with current. By bypassing all the remaining switches, or by adjustment of the relative position, respectively, and if switch 140 is in the position 152, the inclined conveyor can be lifted and if in position 154, it can be lowered.

A further advantageous embodiment of the present invention is shown in FIG. 7. In this embodiment, only one switching position is provided for the command "Position". The reciprocal switching-on of the switches on the inclined conveyor, caused by the inertia behavior of the cutter mechanism, is avoided in that a time switch is inserted into one lead which time switch will pass the command from the switch on the inclined conveyor only after a certain predetermined time delay. The mower has now the time to absorb its own vibrations before the contrary command becomes effective.

In the switching position I, switch 141 is switched to "Automatic". In the switching position 153 as shown of adjustment lever 156, the 0 position is provided. Switch 140 does not pass any current. If adjustment lever 156 is moved into its switching position 152, the current flows via leads 142 and 143 to raise valve 48. The cutter mechanism is lifted contrary to the set relative position until adjustment lever 156 is released into position 153. If it is to be lowered into its relative position, adjustment lever 156 is moved into position 154. The current flows through leads 146 and 160 and feeds switches 114 and 115. Because of the prior lifting, cable 9 has relaxed and rocker lever 111 has been tilted to the left thereby actuating switch 114 which causes the current to flow via lead 161 to time delay member 159. After a short delay, the latter connects leads 161 and 162 and the current flows to switch 44. As the cutter mechanism is pending, switch 44 is actuated and the current flows via lead 163 to lower valve 47. If the cutter mechanism has lowered to the set relative value, cable 9 tightens and switch 114 opens. If switch 115 is now acutated because of the fact that in view of the sudden stop of the lowering process the cutter mechanism is stroking downwardly, the lifting process is switched on for a short time. At once, spring 113 will receive an overweight and will tilt rocker lever 111 to the left. Although the lowering process is now again switched on by switch 114, the cutter mechanism comes to a rest before the command "lowering" is passed by time delay member 159. While the cutter mechanism will very often adjust itself, if for instance a leakage in the hydraulic system causes the cutter mechanism to slowly go down, it cannot initiate vibrations as described above.

If the cutter mechanism is to be lowered contrary to its relative position, adjustment lever 156 is moved into position 155. Switch 44 will now receive current via leads 148, 164, and 162. If the cutter mechanism is pending, switch 44 is closed, as shown, by cam 116 and initiates, via lead 163/165, the lowering process. As soon as the cutter mechanism supports, with the remaining weight, on the ground, cam 116 leaves switch 44. The latter terminates the lowering process by switching over and passes the current via lead 166 to switch 43. If the cutter mechanism runs against a ground wave, cam 116 actuates switch 43 thereby initiating, via leads 167 and 143, the lifting process.

If the cutter mechanism is to be lifted into its relative position, adjustment lever 156 is moved into its switching position 154. The two switches 114 and 115 are fed the current through leads 146 and 160 and the cutter mechanism adjusts itself to the relative position set by adjustment lever 19, as has been described above.

The further development of the invention which includes switching elements, provided on the inclined conveyor, for setting the relative position, has been described in connection with FIGS. 5, 6, and 7. The advantage is mainly seen in the fact that the frictional losses of switching cable 9, if conducted for constructional reasons via one or a plurality of reversing rollers, eyes or the like 110, cannot affect switch, or switches, 114 and 115 as spring 18 which absorbs the change of the length, and spring 113 act directly on switching member 111.

The explanation of the invention in the drawing and the specification by referring to rocker lever 111 and the two switches 114 and 115 should be considered as an exemplified embodiment. In practise, it is possible to combine the switching functions of switches 114 and 115 within one single switch having corresponding openers and/or closers and/or switch-overs. Spring 113 might be incorporated within such a switch as well.

In FIG. 8, a further embodiment of the invention is described wherein the cutter mechanism cannot vibrate either in that, caused by the inertia behavior of the cutter mechanism, opposed switching impulses become effective.

Contrary to the embodiments described in the foregoing, cable 9 actuates only one contact.

The switching position 153 as shown of adjustment lever 156 constitutes the zero position. If switch 141 is switched to position I, adjustment lever 156 is locked in position 152 for the command "lifting". The current flows via leads 142 and 143 to raise valve 48 and the cutter mechanism is lifted contrary to the relative position set by lever 19. Cable 9 relaxes, and by the overweight of spring 113 so formed, rocker lever 111 is tilted to the left. Switch 114 connects the two leads 160 and 161 with one another. If the operator releases adjustment lever 156 into the zero position 153, the cutter mechanism will remain on the elevated value. If the adjustment lever 156 is moved into position 154, the current flows via leads 146 and 160 to switch 114. As the latter is closed, the current flows via lead 161 to switch 44 and, as this one is locked as well if the cutter mechanism is pending, via lead 163 to lower valve 47.

The cutter mechanism is lowered until cable 9 tightens and tilts rocker lever 111 to the right. Switch 114 is energized and interrupts the lowering process.

If the cutter mechanism is to be lowered contrary to its relative position, adjustment lever 156 is moved into position 155. The current flows via leads 148 and 164 to switch 44 and via leads 163 to lower valve 47. The cutter mechanism is lowered until a remaining weight touches the ground and cam 116 leaves switch 44. The latter is energized and the current flows via lead 166 to switch 43. If an obstacle is run into, the spring elements expand and cam 116 actuates switch 43 for "lifting".

If the cutter mechanism is to be raised to the relative value set on lever 19, the operator must lock adjustment lever 156 into switching position 152 and keep it closed until the cutter mechanism has been lifted that much that cable 9 is relaxed, thus closing switch 114 and connecting leads 160 and 161 again. If the operator moves adjustment lever 156 into switching position 154, the cutter mechanism is lowered again to the relative value set on adjustment lever 19.

We claim:

1. In a harvester, such as a combine harvester, a chassis, a cutter mechanism carried by said chassis to be raised and lowered with respect thereto so as to have its elevation with respect to the ground regulated, and hydraulic means connected between said chassis and cutter mechanism for raising and lowering the latter, a control system for controlling the raising and lowering of the cutter mechanism, said control system comprising a pair of series-connected spring means and a cable operatively connected thereto, said spring means and cable connecting said cutter mechanism to said chassis, and manually operable lever means operatively connected with at least one of said spring means for controlling the force thereof, raise valve means and lower valve means operatively connected with said hydraulic means for controlling the latter to raise or lower the cutter mechanism, and switch means connected between said pair of spring means and operatively connected with said raise or lower valve means for actuating one or the other thereof for bringing about raising or lowering of the cutter mechanism, said switch means also having a neutral position where neither of said valve means is actuated, said lever means being operatively connected with said chassis for movement with respect thereto and both of said spring means being operatively connected through said cable with said lever means to be adjusted 2. The combination of claim 1 and wherein beyond said pair of series-connected spring means said cable is connected to said cutter mechanism and to said lever means while between said pair of spring means said switch means is situated for actuating one or the other of said valve means.

3. The combination of claim 1 and wherein a weight-responsive means is operatively connected between said cutter mechanism and pair of valve means for controlling the latter in a manner overriding control of said pair of valve means by said switch means in response to the weight of said cutter means.

4. The combination of claim 1 and wherein an additional manually operable means is provided for controlling the cutter mechanism manually while overriding controls by said switch means.

5. The combination of claim 1 and wherein both of said valve means are electromagnetic valve means and a circuit means controlled by said lever means, additional manually operable means, and weight-responsive control means, for actuating through switches of said circuit means said pair of valve means.

6. The combination of claim 5 and wherein said circuit means includes an additional switch means forming part of said circuit means and operatively connected with said weight-responsive control means for rendering the latter operative or inoperative.

7. The combination of claim 4 and wherein said circuit means includes a pair of switches operatively connected with said pair of valve means for respectively controlling the latter, said pair of switches being situated adjacent each other and adjacent said switch means located between said pair of spring means, and manually operable switch means forming part of said circuit means and operatively connected with said pair of valve means for controlling the latter to return the cutter mechanism to a preselected position while maintaining only one of said pair of switches energized.

8. The combination of claim 7 and wherein a switch-delay means is located in said circuit means between one of said pair of switches and the valve means controlled thereby.

9. The combination of claim 8 and wherein said delay means is situated between one of said pair of switches and the valve means which brings about lowering of the cutter mechanism.

10. The combination of claim 7 and wherein the one of the pair of switches which controls the valve means for bringing about lowering of the cutter mechanism and a switch means forming part of the weight-responsive control means for operating the valve means which brings about lowering of the cutter mechanism are connected in series.

11. The combination of claim 4 and wherein said additional manually operable means has four positions with a separate neutral position.

12. The combination of claim 11 and wherein said additional manually operable means is in the form of a switch transversely movable between its positions in mutually perpendicular directions.

13. The combination of claim 11 and wherein said additional manually operable means is in the form of a plurality of switches arranged in a row.

14. The combination of claim 11 and wherein said additional manually operable means has a pair of positions one of which is provided for returning the cutter mechanism from its raised position and the other of which is provided for returning the cutter mechanism from its lowered position to a preselected elevation.

15. The combination of claim 4 and wherein at least one foot-operated switch is provided for duplicating the operations of the manually operable controls.

16. The combination of claim 3 and wherein a single switch is operatively connected with said switch means situated between said pair of spring means to be operated thereby, said weight-responsive means including a switch and the latter being connected in series with said single switch and the valve means which brings about lowering of the cutter mechanism.

17. The combination of claim 16 and wherein a manually operable means is provided for producing in one position manual controls and in another position automatic controls.

18. The combination of claim 16 and wherein a multiple-position 3-way switch means is provided for selecting between manual operation, automatic operation, or no operation.

* * * * *